United States Patent
Edminster et al.

(10) Patent No.: US 11,960,883 B1
(45) Date of Patent: *Apr. 16, 2024

(54) AUTOMATED GENERATION OF RELEASE NOTE DATA OBJECTS BASED AT LEAST IN PART ON RELEASE-TIME CONFIGURATION SETTINGS

(71) Applicant: Liberty Mutual Insurance Company, Boston, MA (US)

(72) Inventors: Matthew Edminster, Portsmouth, NH (US); Niall Collins, Dublin, NH (US)

(73) Assignee: LIBERTY MUTUAL INSURANCE COMPANY, Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/822,203

(22) Filed: Aug. 25, 2022

Related U.S. Application Data

(63) Continuation of application No. 17/201,704, filed on Mar. 15, 2021, now Pat. No. 11,461,093.

(60) Provisional application No. 62/989,242, filed on Mar. 13, 2020.

(51) Int. Cl.
  *G06F 8/73* (2018.01)
  *G06F 8/60* (2018.01)

(52) U.S. Cl.
  CPC .................. *G06F 8/73* (2013.01); *G06F 8/60* (2013.01)

(58) Field of Classification Search
  CPC ...................................... G06F 8/73; G06F 8/60
  See application file for complete search history.

(56) References Cited

U.S. PATENT DOCUMENTS

| | | |
|---|---|---|
| 7,376,719 B1 | 5/2008 | Shafer et al. |
| 8,572,679 B1 | 10/2013 | Wang et al. |
| 8,997,088 B2 | 3/2015 | Gurikar et al. |
| 9,454,351 B2 | 9/2016 | Anderson et al. |
| 9,477,454 B2 | 10/2016 | Scheiner et al. |
| 9,785,431 B2 | 10/2017 | Chen et al. |
| 9,910,654 B1 | 3/2018 | Brigham, II et al. |
| 10,296,302 B1 | 5/2019 | Ma et al. |
| 10,389,651 B2 | 8/2019 | Ferris et al. |

(Continued)

OTHER PUBLICATIONS

"Automated Release Notes For Jira," Amoeboids Technologies Pvt. Ltd., Atlassian Marketplace, (3 pages), [online], [Retrieved from the Internet Jun. 14, 2021] <https://marketplace.atlassian.com/apps/1215431/automated-release-notes-for-jira?hosting=cloud&tab=overview>.

(Continued)

*Primary Examiner* — Wei Y Zhen
*Assistant Examiner* — Amir Soltanzadeh
(74) *Attorney, Agent, or Firm* — ALSTON & BIRD LLP

(57) ABSTRACT

Methods, apparatuses, systems, computing entities, and/or the like are provided. An example method may include retrieving software development data associated with a software application; receiving modular configuration data from a client system; determining application usage data based at least in part on a user profile of the client system that is associated with the software application; generating a release note data object based at least in part on at least one of the software development data, the modular configuration data, and the application usage data; and performing one or more software application release operations by transmitting the release note data object to the client system.

17 Claims, 9 Drawing Sheets

(56) References Cited

U.S. PATENT DOCUMENTS

| | | | |
|---|---|---|---|
| 10,409,562 | B2 | 9/2019 | Leonelli et al. |
| 10,503,496 | B2 | 12/2019 | Natari |
| 10,824,414 | B2 | 11/2020 | Kuchibhotla et al. |
| 10,877,735 | B1 | 12/2020 | Buck et al. |
| 10,884,767 | B2 * | 1/2021 | Zhou ................ G06F 8/64 |
| 10,929,378 | B1 | 2/2021 | Bigman et al. |
| 11,281,570 | B2 | 3/2022 | Zhou |
| 11,461,093 | B1 | 10/2022 | Edminster et al. |
| 2003/0005093 | A1 | 1/2003 | Deboer et al. |
| 2006/0190486 | A1 | 8/2006 | Zhou et al. |
| 2006/0277542 | A1 | 12/2006 | Wipfel |
| 2006/0291398 | A1 | 12/2006 | Potter et al. |
| 2008/0104573 | A1 | 5/2008 | Singla et al. |
| 2010/0131939 | A1 | 5/2010 | Hieb et al. |
| 2012/0311471 | A1 | 12/2012 | Bullard et al. |
| 2014/0149966 | A1 | 5/2014 | Binjrajka |
| 2014/0298321 | A1 | 10/2014 | Morino et al. |
| 2014/0304690 | A1 | 10/2014 | Wohlberg et al. |
| 2015/0067642 | A1 | 3/2015 | Chen et al. |
| 2015/0301824 | A1 | 10/2015 | Patton et al. |
| 2016/0269227 | A1 | 9/2016 | Alford et al. |
| 2017/0039035 | A1 | 2/2017 | Woodward |
| 2017/0083290 | A1 | 3/2017 | Bharthulwar |
| 2018/0083840 | A1 | 3/2018 | Poonen et al. |
| 2018/0157466 | A1 | 6/2018 | Jubran et al. |
| 2018/0267779 | A1 | 9/2018 | Leonelli et al. |
| 2018/0336027 | A1 | 11/2018 | Narayanan et al. |
| 2019/0012183 | A1 | 1/2019 | Saunders |
| 2020/0409690 | A1 | 12/2020 | Rouland et al. |
| 2021/0049002 | A1 | 2/2021 | Myers et al. |
| 2021/0096826 | A1 | 4/2021 | Duggal et al. |
| 2022/0164452 | A1 | 5/2022 | Landman |

OTHER PUBLICATIONS

"Automating Infrastructure Deployments In The Cloud With Terraform and Azure Pipelines," Azure DevOps Labs, May 31, 2021, (17 pages), (online), [Retrieved from the Internet Jun. 14, 2021] <https://azuredevopslabs.com/labs/vstsextend/terraform/>.

"Continuous Delivery Pipeline 101," Atlassian CI/CD, (11 pages), (article, online), [Retrieved from the Internet Jun. 14, 2021] <https://www.atlassian.com/continuous-delivery/pipeline>.

"Continuous Delivery Pipelines: Metrics, Myths, and Milestones," Slideshare, Jan. 24, 2018, (23 pages), (online), [Retrieved from the Internet Jun. 14, 2021] <https://www.slideshare.net/DevOpsWebinars/continuous-delivery-pipelines-metrics-myths-and-milestones>.

"Release Pipelines," Azure Pipelines, Microsoft, Dec. 16, 2020, (14 pages), (online), [Retrieved from the Internet Jun. 14, 2021] <https://docs.microsoft.com/en-us/azure/devops/pipelines/release/?view=azure-devops>.

"Run Automated Tests From Test Plans," Microsoft, Azure DevOps, Sep. 30, 2019 (19 pages), (online), [Retrieved from the Internet Jun. 14, 2021] <https://docs.microsoft.com/en-us/azure/devops/test/run-automated-tests-from-test-hub?view=azure-devops>.

"Use Pipelines As Code In Armory Enterprise," Armory Docs, (29 pages), (article, online), [Retrieved from the Internet Jun. 14, 2021] <https://docs.armory.io/docs/spinnaker-user-guides/using-dinghy/>.

Fennell, Richard (Black Marble). "Generate Release Notes (Crossplatform)," Visual Studio Marketplace, (9 pages), Apr. 12, 2017, (article, online), [Retrieved from the Internet Jun. 14, 2021] <https://marketplace.visualstudio.com/items?itemName=richardfennellBM.BM-VSTS-XplatGenerateReleaseNotes>.

Final Office Action for U.S. Appl. No. 17/201,696, dated May 3, 2022, (28 pages, United States Patent and Trademark Office, US.

Moreno, Laura et al. "Automatic Generation of Release Notes," In Proceedings of the 22nd ACM SIGSOFT International Symposium on Foundations of Software Engineering, Nov. 11, 2014, pp. 484-495, DOI: 10.1145/2635868.2635870.

NonFinal Office Action for U.S. Appl. No. 17/201,696, dated Oct. 14, 2021, (24 pages), United States Patent and Trademark Office, USA.

NonFinal Office Action for U.S. Appl. No. 17/201,704, dated Feb. 4, 2022, (37 pages), United States Patent and Trademark Office, USA.

NonPatent Office Action for U.S. Appl. No. 17/201,692, dated Mar. 3, 2022, (22 pages), United States Patent and Trademark Office, USA.

Notice of Allowance and Fee(s) Due for U.S. Appl. No. 17/201,692, dated Jun. 20, 2022, (15 pages), U.S. Patent and Trademark Office, US.

Notice of Allowance and Fee(s) Due for U.S. Appl. No. 17/201,704, dated Jun. 9, 2022, (15 pages), U.S. Patent and Trademark Office, US.

Pujol, Johan. "Create Automatic Release Notes On AzureDevOps," Digikare, Jan. 24, 2019, (5 pages), (article, online), [Retrieved from the Internet Jun. 14, 2021] <https://medium.com/digikare/create-automatic-release-notes-on-azuredevops-f235376ec533>.

Szabo, Levente. "Save Time Emailing Release Notes From Jira Automatically," Midori, Oct. 15, 2018, (8 pages), (article, online), [Retrieved from the Internet Jun. 14, 2021] <https://www.midori-global.com/blog/2018/10/15/save-time-compiling-release-notes-with-automation-for-Jira-and-better-pdf-automation-for-jira>.

NonFinal Office Action for U.S. Appl. No. 17/201,696, dated Jan. 10, 2023, United States Patent and Trademark Office, US.

NonFinal Office Action for U.S. Appl. No. 17/930,248, dated Mar. 23, 2023, (20 pages), United States Patent and Trademark Office, US.

Final Office Action for U.S. Appl. No. 17/201,696, dated Jun. 14, 2023, (28 pages), United States Patent and Trademark Office, US.

Notice of Allowance and Fees Due for U.S. Appl. No. 17/930,248, dated Oct. 4, 2023, (10 pages), United States Patent and Trademark Office, US.

* cited by examiner

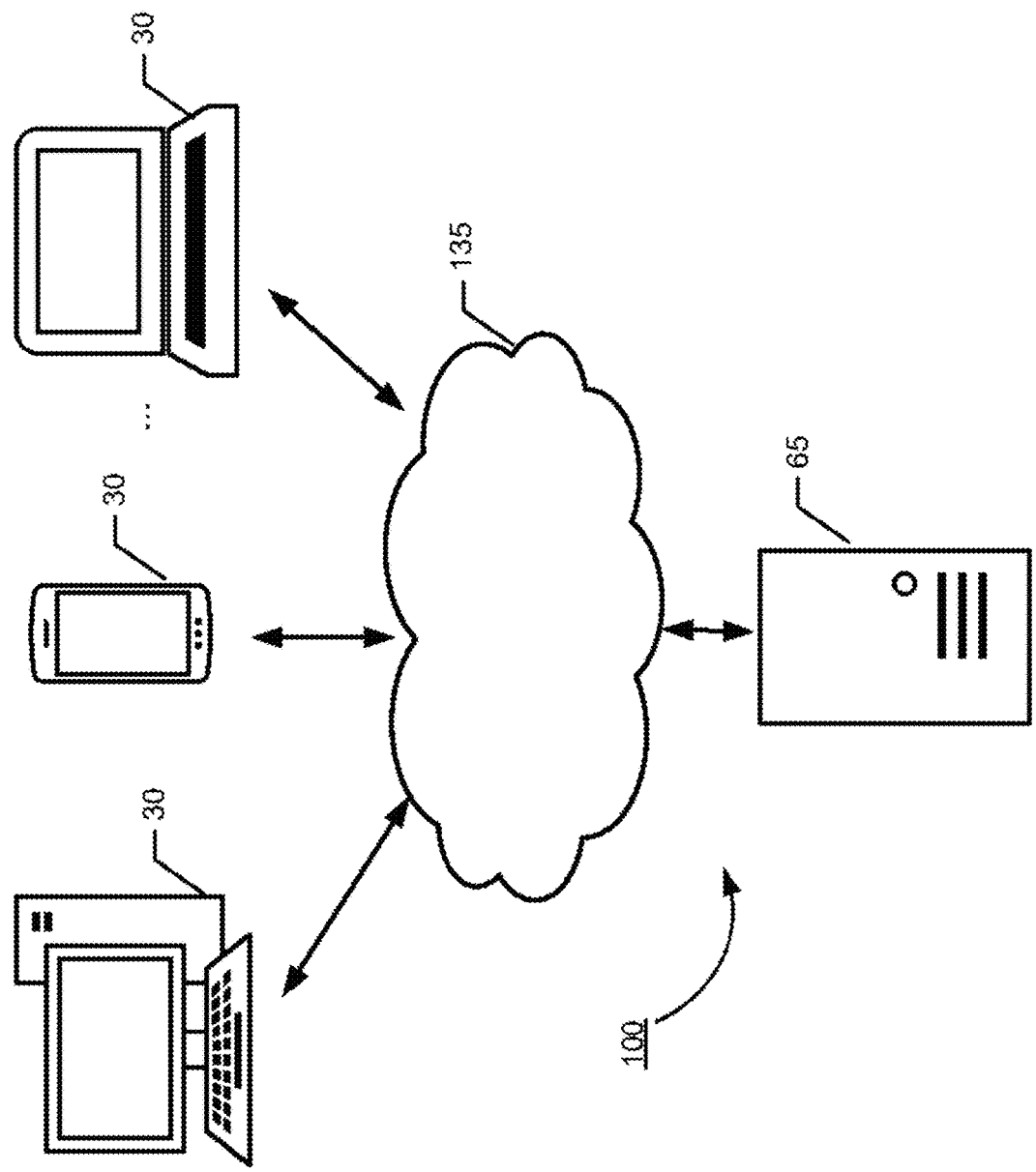

AUTOMATED GENERATION OF RELEASE NOTE DATA OBJECTS BASED AT LEAST IN PART ON RELEASE-TIME CONFIGURATION SETTINGS

CROSS-REFERENCES TO RELATED APPLICATIONS

The present application is a continuation of U.S. application Ser. No. 17/201,704 filed Mar. 15, 2021, which claims priority to the U.S. Application No. 62/989,242 filed Mar. 13, 2020, which is incorporated herein by reference in their entireties.

TECHNOLOGICAL FIELD

Embodiments of the present disclosure relate generally to automatically generating release note data objects for software application (including, but not limited to, operating systems and/or third-party applications). In particular, examples of the present application generate and transmit release note data objects to client systems along with corresponding environment-specific images and/or client-specific images.

BACKGROUND

Applicant has identified many technical challenges and limitations associated with software application release.

BRIEF SUMMARY

In general, embodiments of the present disclosure provide methods, apparatuses, systems, computing devices, computing entities, and/or the like.

In accordance with various embodiments of the present disclosure, an apparatus is provided. The apparatus may comprise at least one processor and at least one non-transitory memory comprising a computer program code. The at least one non-transitory memory and the computer program code may be configured to, with the at least one processor, cause the apparatus to retrieve software development data associated with a software application; receive modular configuration data from a client system; determine application usage data based at least in part on a user profile of the client system that is associated with the software application; generate a release note data object based at least in part on at least one of the software development data, the modular configuration data, and the application usage data; and perform one or more software application release operations by transmitting the release note data object to the client system.

In some embodiments, the software development data comprises at least one of task ticket data, incident data, or configuration data.

In some embodiments, the at least one non-transitory memory and the computer program code are configured to, with the at least one processor, cause the apparatus to: retrieve the software development data from a software provisioning platform.

In some embodiments, the at least one non-transitory memory and the computer program code are configured to, with the at least one processor, cause the apparatus to: retrieve the software development data from an application deployment platform.

In some embodiments, the at least one non-transitory memory and the computer program code are configured to, with the at least one processor, cause the apparatus to extract the software development data from an external platform; generate parsed software development data based at least in part on parsing the software development data; and generate structured feature data based at least in part on conducting natural language processing operation on the parsed software development data, wherein the release note data object is generated based at least in part on the structured feature data.

In some embodiments, the modular configuration data comprises at least one configuration module. In some embodiments, the at least one non-transitory memory and the computer program code are configured to, with the at least one processor, cause the apparatus to: update the software development data based at least in part on the at least one configuration module.

In some embodiments, the modular configuration data comprises cross-application modular configuration data shared among a plurality of software applications on the client system.

In some embodiments, the modular configuration data comprises cross-application modular configuration data shared among a plurality of software applications of a same application type.

In accordance with various embodiments of the present disclosure, a computer-implemented method is provided. The computer-implemented method may comprise retrieving software development data associated with a software application; receiving modular configuration data from a client system; determining application usage data based at least in part on a user profile of the client system that is associated with the software application; generating a release note data object based at least in part on at least one of the software development data, the modular configuration data, and the application usage data; and performing one or more software application release operations by transmitting the release note data object to the client system.

In some embodiments, the software development data comprises at least one of task ticket data, incident data, or configuration data.

In some embodiments, the computer-implemented method further comprises: retrieving the software development data from a software provisioning platform.

In some embodiments, the computer-implemented method further comprises: retrieving the software development data from an application deployment platform.

In some embodiments, the computer-implemented method further comprises: extracting the software development data from an external platform; generating parsed software development data based at least in part on parsing the software development data; and generating structured feature data based at least in part on conducting natural language processing operation on the parsed software development data, wherein the release note data object is generated based at least in part on the structured feature data.

In some embodiments, the computer-implemented method further comprises: updating the software development data based at least in part on the at least one configuration module.

In some embodiments, the modular configuration data comprises cross-application modular configuration data shared among a plurality of software applications on the client system.

In some embodiments, the modular configuration data comprises cross-application modular configuration data shared among a plurality of software applications of a same application type.

In accordance with various embodiments of the present disclosure, a computer program product is provided. The computer program product may comprise at least one non-transitory computer-readable storage medium having computer-readable program code portions stored therein. The computer-readable program code portions may comprise an executable portion configured to retrieve software development data associated with a software application; receive modular configuration data from a client system; determine application usage data based at least in part on a user profile of the client system that is associated with the software application; generate a release note data object based at least in part on at least one of the software development data, the modular configuration data, and the application usage data; and perform one or more software application release operations by transmitting the release note data object to the client system.

In some embodiments, the software development data comprises at least one of task ticket data, incident data, or configuration data.

In some embodiments, the computer-readable program code portions comprise the executable portion configured to: retrieve the software development data from a software provisioning platform.

In some embodiments, wherein the computer-readable program code portions comprise the executable portion configured to: retrieve the software development data from an application deployment platform.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is an example diagram of an example system that can be used in conjunction with various embodiments of the present invention;

Figure 7:
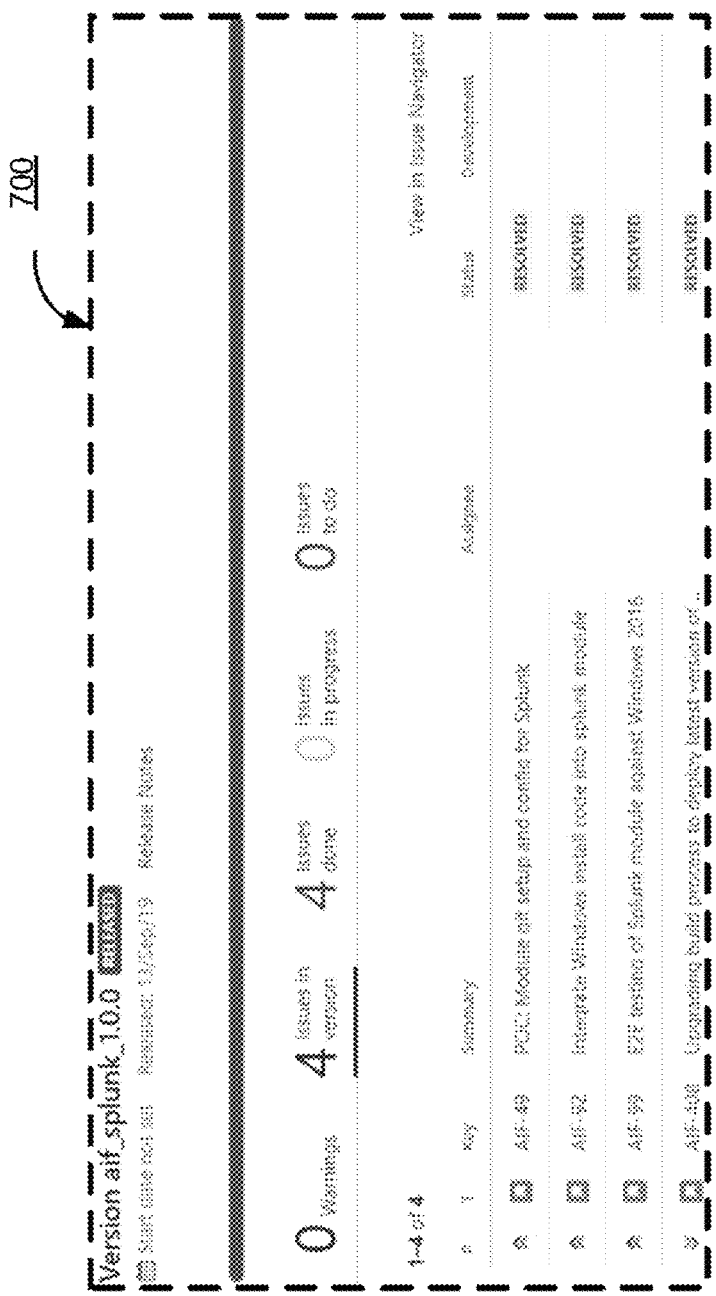
Figure 8:

FIG. 7 provides an operational example of various software development tickets that can be used to generate software development data in accordance with certain embodiments of the present invention; and FIG. 8 provides an operational example of various software release note entries in accordance with certain embodiments of the present invention.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout.

I. Overview

Various embodiments of the present disclosure relate generally to software application release. More specifically, various embodiments of the present disclosure are related to automatically generating and transmitting release note data objects for software application (including, but not limited to, operating systems and/or third-party applications).

As described above, there are technical challenges, deficiencies and problems associated with software application release. In a cloud environment where one or more software applications are released from one or more remote servers to one or more client systems, users of the client systems may be blindsided by the release of software applications. For example, many users may not be aware of the content of the software application, which may create many technical challenges and deficiencies, such as, but not limited to, combability issues with the newly software application and existing software applications on the client device. In examples where a network admonitor manually prepares a release note for a to-be-released software application, the manually prepared release note may be error-ridden and overlook important content of the to-be-released software application. Further, the manual preparation process may be time consuming, causing unnecessary delays in releasing the software application. All of these may in turn undermine the efficiency and operational reliability of a deployed software application and the software application frameworks within which the noted software application is deployed.

Various embodiments of the present disclosure overcome the above-referenced technical challenges, deficiencies and problems. For example, various embodiments of the present disclosure provide methods, apparatus, and systems for automated generation of release note data object for software applications. Various embodiments of the present disclosure may utilize a combination of software development data (such as, but not limited to, Jira tickets), modular client configuration data, and application usage data to generate release note data objects. Additionally, certain embodiments of the present disclosure retrieve release note data object templates and utilize predictive data analysis models to probabilistically bind data fields inferred from at least one of the software development data, modular client configuration data, and application usage data to desired data items in the release note data object templates. Additionally, certain embodiments of the present disclosure provide the release note data object to a client system while releasing the software application. The release note data object may be provided via various methods, including an entry into a wiki server and/or a cloud management server as well as over communication platforms (such as Slack or Teams). By using the described techniques, various embodiments of the present invention address challenges related to improving the efficiency and operational reliability of a deployed software application and the software application frameworks within which the noted software application is deployed.

II. Definitions

In the present disclosure, the term "data object" may refer to a data structure that represents one or more functionalities and/or characteristics (e.g., feature) associated with data and/or information. In some embodiments, the data object may comprise one or more metadata. The term "metadata" may refer to a parameter, a data field, a data element, or the like that describes an attribute of a data object. In some embodiments, metadata may include text string(s), numerical character(s), alphabetical character(s), alphanumeric code(s), American Standard Code for Information Interchange (ASCII) character(s), and/or the like.

In the present disclosure, the term "image" may refer to a data object that represents a replica of data, information, configurations, and/or contents that are stored in a physical computer storage device (such as, but is not limited to, a hard disk drive, a compact disc read-only memory (CD-ROM, and/or the like) and/or a virtual storage system (for example, in a cloud computing environment where multiple network storage devices are interconnected with one another).

An example image in accordance with the present disclosure may be generated to represent a virtual machine that can be deployed in an enterprise environment. In an example enterprise environment, system administrator(s) manage a high number of servers that are configured to deliver applications and/or services to others (such as, but is not limited to, another user within the same organization, a consumer that is outside the organization, and/or the like). By generating, customizing, validating, and deploying images, system administrator(s) in the example enterprise environment are able to reduce duplication and infrastructure cost, improve collaboration and resource usage efficiency, and increase predictability and/or consistency of operations in the example enterprise environment.

In some embodiments, an image may be generated, stored and/or transmitted in a non-volatile form. In some embodiments, an image may be generated, stored, and/or transmitted in the format of a disk image file (such as an optical disc image (ISO) file). In some embodiments, an image may be generated, stored, and/or transmitted as a computer file that is formatted in accordance with the specifications of one or more computer visualization and/or emulation applications. For example, an image may be generated, stored, and/or transmitted in the format of an Open Virtualization Appliance (OVA) file, which may be used by visualization/emulation applications such as VMware® (which, additionally, or alternatively, may be installed on premises in a network computing system). As another example, an image may be generated, stored, and/or transmitted in the format of an Amazon Machine Image (AMI) file, which may be used by Amazon® Simple Storage Service (S3) for storage (which is stored in a cloud computing storage). As another example, an image may be generated, stored, and/or transmitted in the format of a Virtual Machine Image (VMI) file, which may be used by cloud computing services such as, but is not limited to, Microsoft® Azure®.

In some embodiments, once an image is generated (for example, by the system administrator(s)), the image may be transmitted through one or more networked computing systems for deployment and/or distribution to a client system. For example, an example image may be deployed and/or distributed to a cloud environment, computing system and/or service such as, but is not limited to, Amazon® Web Service, Microsoft® Azure® Shared Image Gallery, and/or the like. In such an example, the cloud computing system and/or service comprise a plurality of remote servers that are configured to enable multiple client systems within the enterprise environment (within the same region or across different regions), and/or outside the enterprise environment, to operate, access, and/or utilize the image. As another example, an example image may be deployed and/or distributed through a local, on-premise computer network that is within the enterprise environment to multiple client systems within the enterprise environment (within the same region or across different regions), and/or client systems outside the enterprise environment when the local, on-premise computer network is connected to the Internet.

In accordance with various embodiments of the present disclosure, an example image may be associated with at least one software application. For example, an example image may comprise data, information, configurations, and/or contents that are related to the at least one software application. In the present disclosure, the terms "software" or "software application" may refer to a collection of computing instructions and data that can be executed by a processing circuitry (for example, a processor) to conduct one or more operations, perform one or more services, and provide one or more functionalities. For example, a software application may be in the form of an operating system, which is a software application that manages the hardware and/or resource of a computing device and provides one or more basic functions (such as, but not limited to, scheduling tasks, executing applications, and controlling peripherals). As another example, a software application may be in the form of a third-party application, which may be installed on the operating system to expand the functions of the computing device.

In some embodiments, an example image may comprise data, information, configurations, and/or contents that are associated with an example operating system. Examples of operating systems may include, are not limited to, server operating system such as, but not limited to, Windows Server 2016®, Windows Sever 2019®, Linux, Ubuntu, and/or the like.

While the description above provides examples of operating systems that may be implemented in accordance with embodiments of the present disclosure, it is noted that the scope of the present disclosure is not limited to the description above. For example, examples of operating systems may include computer operating systems (such as, but not limited to, Microsoft® Windows®, Apple® MacOS®, Unix, Linus, etc.), smart phone operating systems (such as, but not limited to, Apple® iOS®, Google® Android®), tablet operating systems (such as, but not limited to, Apple® iPadOS®), wearable operating systems (such as, but not limited to, Apple® WatchOS®), and/or the like.

Additionally, or alternatively, an example image may comprise data, information, configurations, and/or contents that are associated with one or more third-party applications. For example, an example image may comprise third-party applications that are required to deliver a service or a portion of a service to a client system. For example, an example image may comprise data, information, configurations, and/or contents associated with an antivirus software application that is configured to prevent, detect, and/or remove computer virus, spyware, malware, and/or the like. Additionally, or alternatively, an example image may comprise data, information, configurations, and/or contents that are associated with productivity software applications that are configured to provide functionalities such as, but not limited to, word processing functionalities, spreadsheet calculation functionalities, presentation generation functionalities, database functionalities, email/communication functionalities, and/or the like. Additionally, or alternatively, an example image may comprise data, information, configurations, and/or contents that are associated with other applications.

In the present disclosure, the term "base image" may refer to an image that is associated with at least one software application (such as, but not limited to, an operating system, one or more third-party applications) as described above. For example, the base image may be an image of a server operating system such as, but not limited to, Windows Server 2016®, Windows Sever 2019®, Linux, Ubuntu, and/or the like. Additionally, or alternatively, the base image may be an image of one or more third-party applications, such as, but not limited to, an antivirus software application, a productivity software application, and/or the like. Additionally, or alternatively, the base image may be an image of both an operating system and one or more third-party applications, where the one or more third-party applications are installed on the operating system.

In some embodiments, an example base image of a software application may include all of the latest software configuration files for the software application. For example, an image of a Microsoft® Windows® software application may include the latest security patches that fix one or more vulnerabilities in the operating system. As another example, an image of a Ubuntu® software application may include the latest security patches that fix one or more vulnerabilities in the operating system.

In some embodiments, an example base image may be generated by updating a raw base image. In the present disclosure, the term "raw base image" may refer to an image that may or may not include all of the latest software configurations for the software application. For example, a raw base image may not include the latest security patches that fix one or more vulnerabilities in the operating system. In some embodiments, a computing entity (such as the central computing entity 65 described herein) may be configured to update the raw base image of the software application by installing the required latest software configuration files for the software application. For example, the computing entity may retrieve the latest security patches for a raw base image of a Windows® operating system and update the raw base image by applying the latest security patches to generate a base image for the Windows® operating system. As another example, the computing entity may retrieve the latest security patches for a raw base image of an Ubuntu® operating system and update the raw base image by applying the latest security patches to generate a base image for the Ubuntu® operating system.

In the present disclosure, the term "customized base image" may refer to an image that is generated by conducting at least one operational verification operation on a base image. In some embodiments, an image is either modified or operationally verified or both in order to generate a customized base image.

In the present disclosure, an "operational verification operation" may refer to a data object that describes a required modification on the software applications and/or the images associated with software applications, and/or or a required testing operation for the software applications and/or the images associated with software applications so that the resulting customized base image satisfies one or more requirements (for example, requirements from the enterprise environment, form the end user, and/or the like).

In some embodiments, an operational verification operation may be a modification operation. In the present disclosure, a "modification operation" may refer to a data operation on an image (for example, a base image) and/or a software application (for example, operating system, third-party application) that modifies one or more parameters of the image and/or software application, such that resulting image (for example, a customized base image) and/or software application satisfies the requirements from the enterprise environment, form the end user, and/or the like. For example, in conducting a modification operation, a processing circuitry may unpack the base image and extract one or more files from the base image. Examples of modification operations may include, but not limited to, editing one or more files within the base image, removing the one or more files within the base images, adjusting the settings of one or more files within the base image, and/or the like.

In some embodiments, an operational verification operation may be a testing operation. In the present disclosure, a "testing operation" may refer to a data operation on the image (for example, base image) and/or a software application (for example, operating system, third-party application) that tests the image and/or the software application, such that resulting image (for example, a customized base image) and/or the software application satisfies the requirements from the enterprise environment, form the end user, and/or the like. For example, in conducting a testing operation, a processing circuitry may create a sandbox environment, execute the image and/or the software application, and determine whether one or more errors have occurred.

In the present disclosure, the term "configuration module" may refer to a data object that describes one or more operational verification operations, such as one or more post-development modification operations that should be conducted on a corresponding software application or an image prior to release/deployment of the software application or the image on the client system, and/or one or more post-development testing operations that correspond to the one or more post-development modification operations. In some embodiments, when a configuration module is executed by a processing circuitry, the processing circuitry may carry out modification operation(s) and testing operation(s) to modify and/or test an image in accordance with those described by the configuration module. For example, a configuration module may be in the form of a file with scripted steps and logic to reach a goal (modification, testing, etc.)

In the present disclosure, the term "validated base image" may refer to an image that is generated by conducting at least one operational testing operation on a customized base image. In the present disclosure, an "operational testing operation" may refer to a data object that describes a universal testing that is required for all software applications and/or images associated with said software applications prior to deploying/releasing software applications and/or images to any environment (for example, any client system) to ensure that the resulting validated base image satisfies one or more requirements (for example, requirements from the enterprise environment, form the end user, and/or the like).

For example, the operational testing operation may be in the form of a general testing operation, which is a type of testing operation for all the images and/or software applications regardless of different formats of the images and/or software applications, and regardless of different operating systems associated with the images and/or the software applications. As an example, a general testing operation may be a security scan on the customized base image. In some embodiments, if the customized base image successfully passes the general testing operation, a processing circuitry may determine that the customized base image is a validated base image. In some embodiments, if the customized based image does not pass the general testing operation, a processing circuitry may determine that the customized base image is not a validated base image, and may further generate a validated base image by conducting one or more modification operations on the customized base image so that it passes the general testing operation.

As another example, the operational testing operation may be in the form of an integration testing operation, which is a type of testing operation that is configured to test the compatibilities of various modification operations that have been conducted on the software application and/or on the image after the software application and/or the image has been developed (for example, those modifications as described by the configuration module). As an example, an integration testing operation may be a compatibility check on the customized base image. In some embodiments, if the customized base image successfully passes the integration testing operation, a processing circuitry may determine that the customized base image is a validated base image. In some embodiments, if the customized based image does not pass the integration testing operation, a processing circuitry may determine that the customized base image is not a validated base image, and may further generate a validated base image by conducting one or more modification operations on the customized base image so that it passes the integration testing operation.

In the present disclosure, the term "release note data object" may refer to a data object that comprises data and/or information describing the content associated with an image and/or a software application that is to be deployed or released to one or more client systems (for example, a validated base image as described above). In various embodiments of the present disclosure, release note data objects may have different structures and/or formats.

In some embodiments, the release note data object may have a structured document format, such as a JavaScript Object Notation (JSON) or Extensible Markup Language (XML) format, and may define desired data item types using structured tags (e.g., JSON tags or XML tags) within the structured document tag.

In some embodiments, the release note data object may be in the form of text string(s), numerical character(s), alphabetical character(s), alphanumeric code(s), American Standard Code for Information Interchange (ASCII) character(s), and/or the like. For example, the release note data object may be in the form of, such as but not limited to, an electronic message, an electronic mail, a short message service (SMS) message, and/or the like. As another example, the release note data object may be in the form of, such as but not limited to, a text file such as .txt and/or a Microsoft Word file.

In some embodiments, the release note data object may comprise computing instructions that, when executed by the client system, cause the client system to carry out one or more operations such as, but not limited to, triggering the display of a notification that indicates the release/deployment of the image (for example, a validated base image) and/or the software application, and/or a notification that describes the content associated with an image and/or a software application that is to be deployed or released to one or more client systems (for example, a validated base image as described above).

As used herein, the term "module" may be a data object that comprises a self-contained collection of data and instructions for a set of configuration operations associated with the module. An example of a module is a software virtualization container, such as a Docker container.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 provides an illustration of a release note data object generation platform/system 100 that can be used in conjunction with various embodiments of the present invention. As shown in FIG. 1, the release note data object generation platform/system 100 may comprise one or more central computing entities 65, one or more user computing entities/client systems 30, one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities, the various embodiments are not limited to this particular architecture.

a. Exemplary Central Computing Entity

Figure 2A:
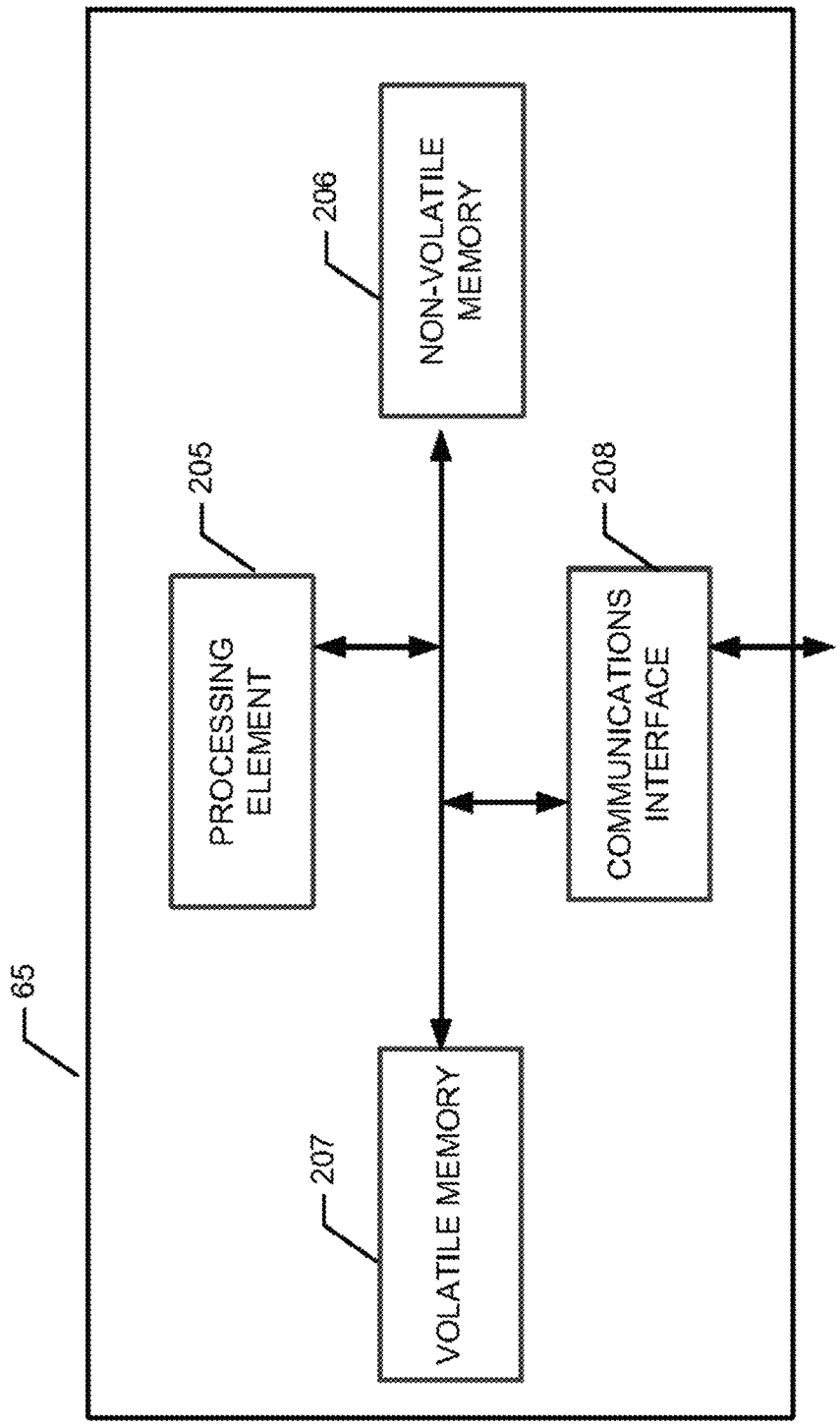
FIG. 2A is an example schematic representation of an example central computing entity in accordance with certain embodiments of the present invention.

FIG. 2A provides a schematic of a central computing entity 65 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the central computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the central computing entity 65 may communicate with other computing entities, one or more user computing entities 30 (also referred to as "client systems" herein), and/or the like.

As shown in FIG. 2A, in one embodiment, the central computing entity 65 may include or be in communication with one or more processing elements 205 (also referred to as processors, processing circuitry, and/or similar terms used herein interchangeably) that communicate with other elements within the central computing entity 65 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the central computing entity 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, metadata repositories database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to may refer to a structured or unstructured collection of information/data that is stored in a computer-readable storage medium.

Memory media 206 (e.g., metadata repository) may also be embodied as a data storage device or devices, as a separate database server or servers, or as a combination of data storage devices and separate database servers. Further, in some embodiments, memory media 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the system may be stored. In some embodiments, the information/data required for the operation of the system may also be partially stored in the cloud data storage system and partially stored in a locally maintained data storage system.

Figure 2B:
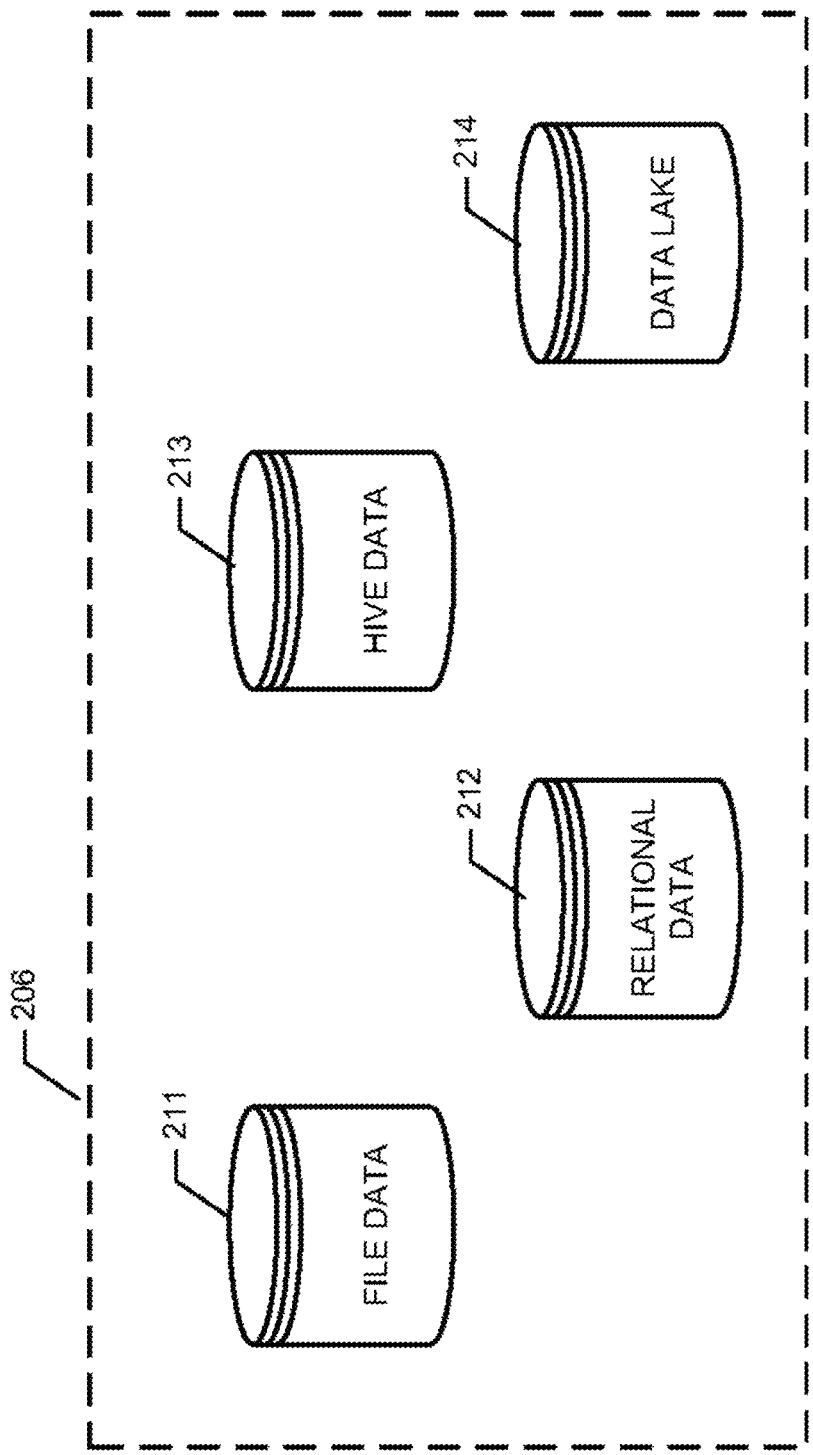
FIG. 2B is an example schematic representation of an example memory media storing a plurality of data assets.

Memory media 206 (e.g., metadata repository) may include information/data accessed and stored by the system to facilitate the operations of the system. More specifically, memory media 206 may encompass one or more data stores configured to store information/data usable in certain embodiments. For example, as shown in FIG. 2B, metadata for data assets may be stored in metadata repositories encompassed within the memory media 206. The metadata for the data assets in the metadata data stores, metadata repositories, and similar words used herein interchangeably may comprise file information/data 211, relational information/data 212, Hive information/data 213, data lake information/data 214, and/or various other types of information/data.

In one embodiment, the central computing entity 65 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the central computing entity 65 with the assistance of the processing element 205 and operating system.

As indicated, in one embodiment, the central computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the central computing entity 65 may communicate with computing entities or communication interfaces of other central computing entities 65, user computing entities 30, and/or the like.

As indicated, in one embodiment, the central computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the central computing entity 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The central computing entity 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the central computing entity's components may be located remotely from other central computing entity 65 components, such as in a distributed system. Furthermore, one or more of the components may be aggregated and additional components performing functions described herein may be included in the central computing entity 65. Thus, the central computing entity 65 can be adapted to accommodate a variety of needs and circumstances.

b. Exemplary User Computing Entity

Figure 3:
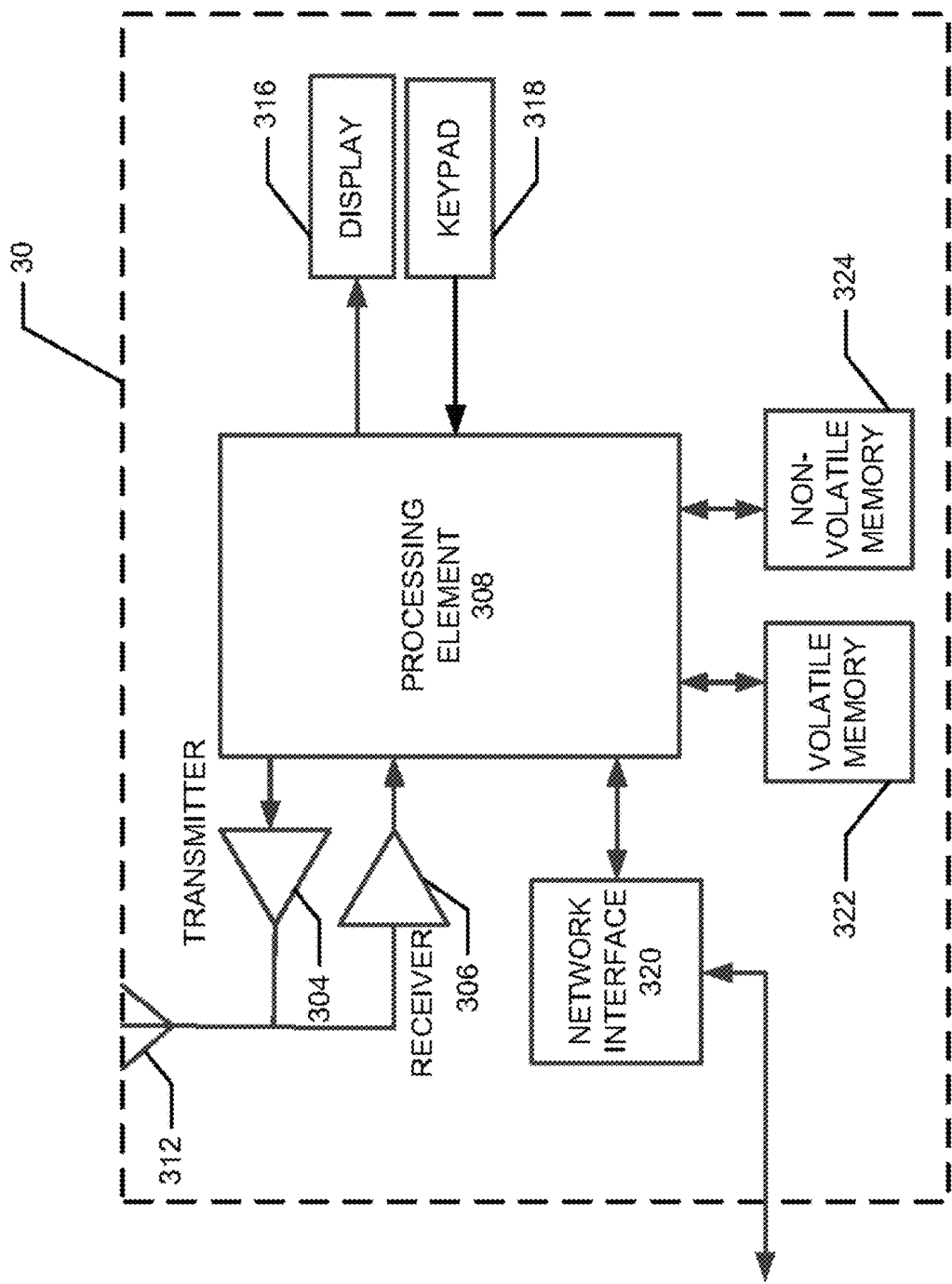
FIG. 3 is an example schematic representation of an example user computing entity in accordance with certain embodiments of the present invention.

FIG. 3 provides an illustrative schematic representative of user computing entity 30 that can be used in conjunction with embodiments of the present invention. As will be recognized, the user computing entity may be operated by an agent and include components and features similar to those described in conjunction with the central computing entity 65. Further, as shown in FIG. 3, the user computing entity may include additional components and features. For example, the user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a central computing entity 65, another user computing entity 30, and/or the like. In this regard, the user computing entity 30 may be capable of operating with one or more air interface standards, communication protocols, modulation types, and access types. More particularly, the user computing entity 30 may comprise a network interface 320, and may operate in accordance with any of a number of wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the central computing entity 65. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Networks

In one embodiment, the networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

V. Exemplary System Operations

Figure 4:
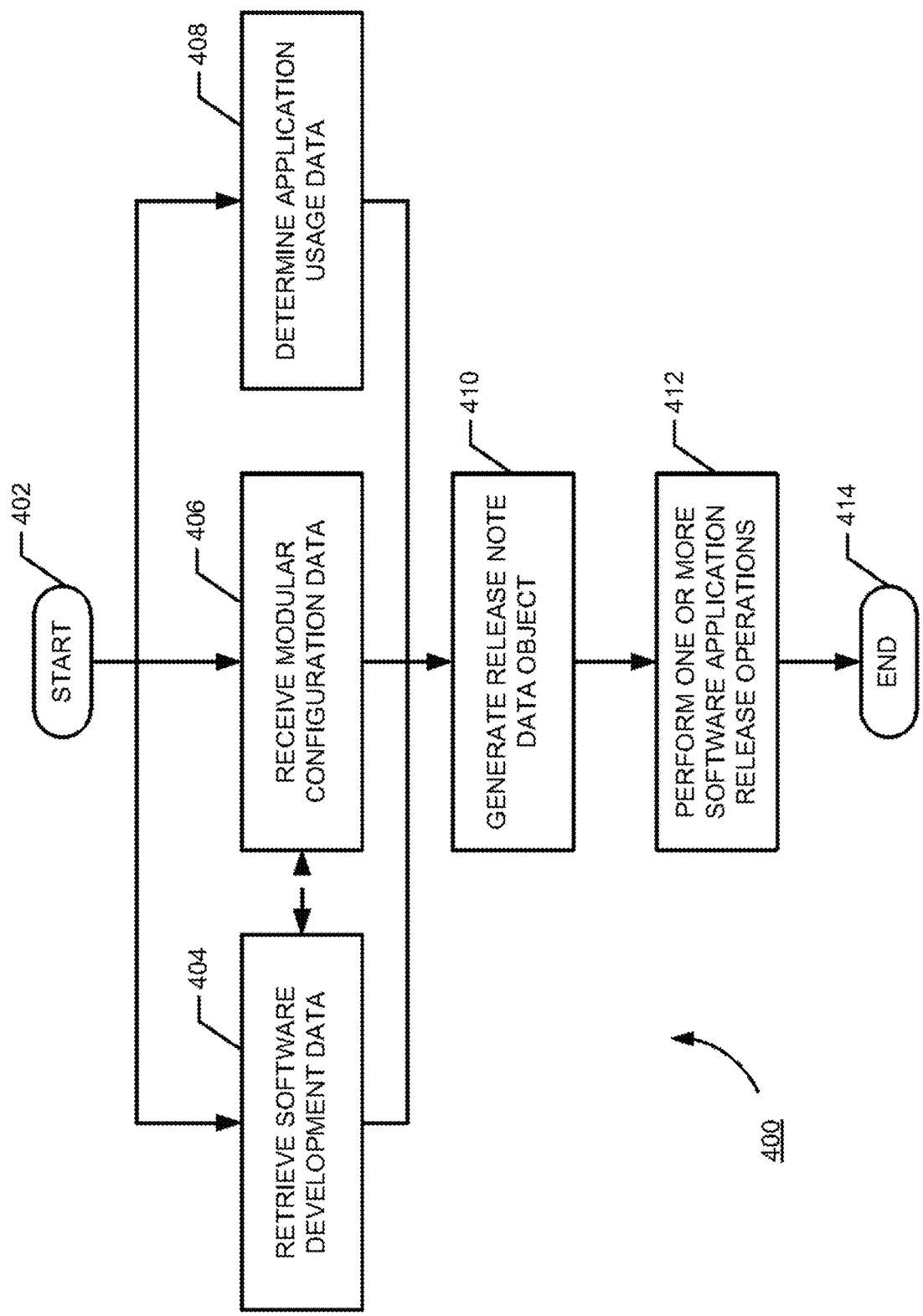
FIG. 4 is an example flowchart diagram of an example process for automatically generating a release note data object for release/deployment of a software application to a particular client system in accordance with certain embodiments of the present invention.
Figure 5:
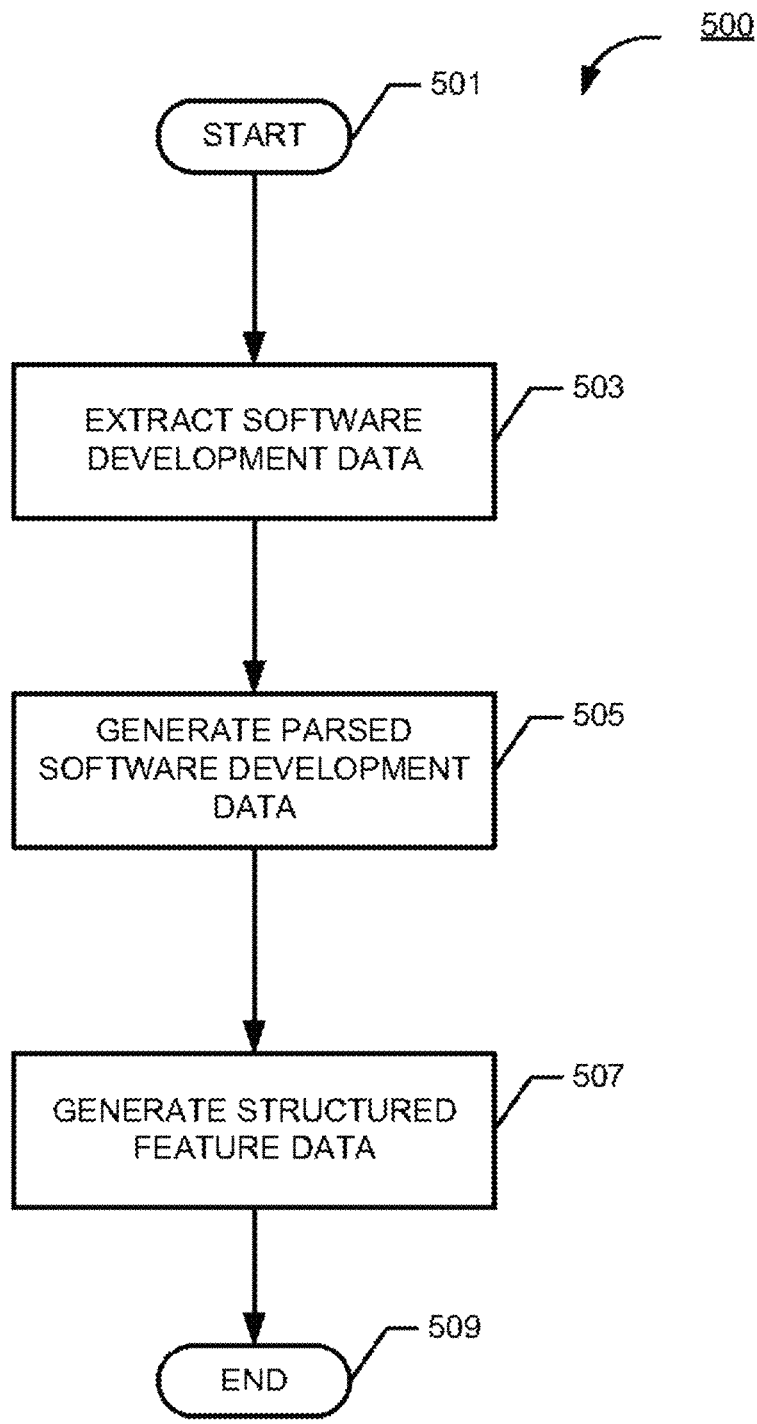
FIG. 5 is an example flowchart diagram of an example process for processing an example software development data in accordance with certain embodiments of the present invention.
Figure 6:
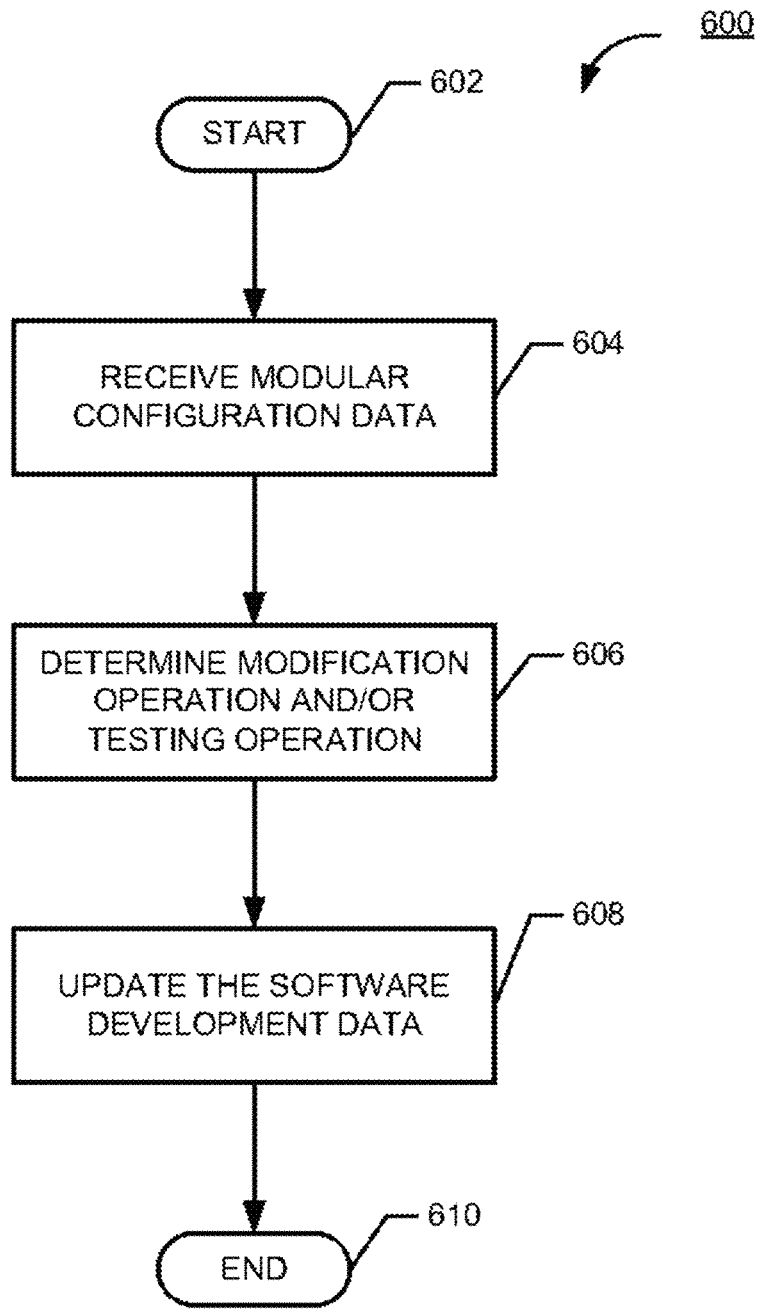
FIG. 6 is an example flowchart diagram of an example process for updating an example software development data in accordance with certain embodiments of the present invention.

Reference will now be made to FIGS. 4, 5, and 6, which provide flowcharts and diagrams illustrating example steps, processes, procedures, and/or operations associated with a release note data object generation platform/system and/or one or more central computing entities in accordance with various embodiments of the present disclosure. FIGS. 7 and 8 provide example views of user interfaces in accordance with various embodiments of the present disclosure.

a. Exemplary Release Note Data Object Generation

Referring now to FIG. 4, an example flowchart diagram is illustrated. In particular, the example flowchart diagram illustrates an example process 400 for automatically generating a release note data object for release/deployment of a software application (e.g., an operating system image) on a client system (e.g., a cloud system including a cloud environment for a particular client entity) based at least in part on release-time configuration settings associated with the software application.

Via the various steps/operations of the example process 400, a processing circuitry (such as, but not limited to, the processing elements 205 of the central computing entity 65 described above in connection with at least FIG. 1 and FIG. 2A) may efficiently and reliably integrate data such as, but not limited to, one or more of application development data, modular configuration data, and/or application usage data to generate release note data objects for release/deployment of the software application on the client system. In some embodiments, the release note data object can then be provided as part of release data for the software application to one or more client computing devices associated with the client system.

Referring back to FIG. 4, the example process 400 begins at step/operation 402. Subsequent to step/operation 402, the example process 400 proceeds to step/operation 404. At step/operation 404, a processing circuitry (such as, but not limited to, the processing elements 205 of the central computing entity 65 described above in connection with at least FIG. 1 and FIG. 2A) retrieves software development data associated with a software application.

In the present disclosure, the term "software development data" may refer to one or more data objects that are generated based at least in part on developer activities during the development of the software application. In some embodiments, software application development data may describe or other indicate one or more aspects associated with the development of the software application.

In some embodiments, example software development data include, but is not limited to, task ticket data generated by interacting with a software development platform (e.g., JIRA® tickets), incident data generated during testing of the software application which may occur as part of the development of the software application, configuration data generated by a software application configuration management platform (e.g., Ansible® configuration data), etc.

In the present disclosure, the term "task ticket data" may refer to a data object that represents one or more software development tasks associated with the software development. In some embodiments, an operational example of various software development task ticket data is depicted the example user interface 700 shown in FIG. 7. In the example shown in FIG. 7, the example task ticket data comprise metadata for each software development task such as, but not limited to, summary of the task, assignee of the task, status of the task, and/or the like.

In the present disclosure, the term "incident data" may refer to a data object that describes information related to software testing that has been conducted during software development (for example, the parameters of software testing, the outcomes of the software testing, and/or the like). The term "configuration data" may refer to a data object that stores configuration information associated with the software application during its development.

In some embodiments, a processing circuitry (such as, but not limited to, the processing elements 205 of the central computing entity 65 described above in connection with at least FIG. 1 and FIG. 2A) identifies and/or retrieves software development data for the software application from one or more external systems/platforms associated with the software development.

For example, the software development data may be generated by a software provisioning platform and retrieved by a processing circuitry (such as, but not limited to, the processing elements 205 of the central computing entity 65 described above in connection with at least FIG. 1 and FIG. 2A) from the software provisioning platform. In the present disclosure, the term "software provisioning platform" may refer to a system/platform that is configured to enable provision or setting up the infrastructure of a software application. Examples of software provisioning platforms may include, but not limited to, AWS CloudFormation provided by AWS.

Additionally, or alternatively, the software development data may be generated by an application deployment platform and retrieved by a processing circuitry (such as, but not limited to, the processing elements 205 of the central computing entity 65 described above in connection with at least FIG. 1 and FIG. 2A) from the application deployment platform. In the present disclosure, the term "application deployment platform" may refer to a system/platform that is configured to deploy or release a software application to a client system. Examples of application deployment platforms may include, but not limited to, Linux, Microsoft® Azure®, and/or the like.

In some embodiments, the software development data may additionally, or alternatively, be generated by other platform(s). In some embodiments, the software development data may be generated based at least in part on interacting with application programming interfaces (APIs) of one or more external platforms, details of which are described herein.

Referring back to FIG. 4, subsequent to step/operation 402 or step/operation 404, the example process 400 proceeds to step/operation 406. At step/operation 406, a processing circuitry (such as, but not limited to, the processing elements 205 of the central computing entity 65 described above in connection with at least FIG. 1 and FIG. 2A) receives modular configuration data from a client system.

In the present disclosure, the term "modular configuration data" may refer to a data object that describes one or more client configuration modules for at least one of the software application and the client system. The term "client configuration module" may refer to a data object that describes desired contents of a release note data object for the software application.

In some embodiments, the client configuration module is provided to a processing circuitry (such as, but not limited to, the processing elements 205 of the central computing entity 65 described above in connection with at least FIG. 1 and FIG. 2A) by a client device associated with the client system. In some embodiments, the processing circuitry identifies the modular configuration data from the client configuration modules.

For example, a particular client configuration module may require inclusion and/or exclusion of particular content data from the release note data object. As another example, a particular client configuration module may specify one or more hardware systems on which the software application will be deployed within the client system. In the latter example, based at least in part on the operating system specifications, a processing circuitry (such as, but not limited to, the processing elements 205 of the central computing entity 65 described above in connection with at least FIG. 1 and FIG. 2A) may exclude configuration details related to non-specified hardware systems from the generated release note data object for the software application being released/deployed on the client system.

In some embodiments, modular configuration data includes cross-application modular configuration data that includes client configuration modules that are shared among all software applications (e.g., for all operating system images) that are deployed on the client system. In some embodiments, the cross-application modular configuration data may be modified by user profiles associated with the client system over time.

In some embodiments, modular configuration data includes cross-application modular configuration data that includes client configuration modules that are shared among all software applications of a same/particular type (e.g., for all operating system images having a particular operating system type) that are deployed on the client system. In some embodiments, the cross-application modular configuration data may be modified by user profiles associated with the client system over time.

In some embodiments, modular configuration data includes cross-application modular configuration data that includes client configuration modules that are shared among all software applications (e.g., for all operating system images) that are deployed on any client system (for example, deployed on a first client system and a second client system that has a different operating system than the first client system).

In some embodiments, modular configuration data includes cross-application modular configuration data that includes client configuration modules that are shared among all software applications of a particular type (e.g., for all operating system images having a particular operating system type) that are deployed on any client system (for example, deployed on a first client system and a second client system that has a different operating system than the first client system).

In some embodiments, a client configuration module may include information about required configuration modification operations for the software application, which in turn may cause one or more modifications to the software application. In some of the noted embodiments, a processing circuitry (such as, but not limited to, the processing elements 205 of the central computing entity 65 described above in connection with at least FIG. 1 and FIG. 2A) is configured to update the software development data identified at step/operation 404 based at least in part on at least a portion of the noted one or more modification operations, details of which are described herein.

In some embodiments, a client configuration module includes information about required testing operations for the software application prior to the release/deployment of the software application. In some of the noted embodiments, a processing circuitry (such as, but not limited to, the processing elements 205 of the central computing entity 65 described above in connection with at least FIG. 1 and FIG. 2A) is configured to update the software development data identified at step/operation 401 based at least in part on at least a portion of the noted testing operations, details of which are described herein.

Referring back to FIG. 4, subsequent to step/operation 402, the example process 400 proceeds to step/operation 408. At step/operation 408, a processing circuitry (such as, but not limited to, the processing elements 205 of the central computing entity 65 described above in connection with at least FIG. 1 and FIG. 2A) determines application usage data based at least in part on a user profile of the client system that is associated with the software application.

In the present disclosure, the term "application usage data" may refer to a data object that describe the usage associated with a software application. For example, example application usage data may describe which user profiles and/or client devices associated with the client system is likely to use the software application and/or has used the software application in the past. Additionally, or alternatively, the application usage data may describe, for each user profile and/or client device associated with the client system, a range of software application components within the software application that the user profile and/or the client device is more likely to access and/or a range of software application components within the software application that the user profile and/or the client device has used in the past.

In some embodiments, the processing circuitry determines the application usage data based at least in part on a user profile of the client system that is associated with the software application. In the present disclosure, the term "user profile" may refer to a data object that comprises data/information associated with a specific user of the client system.

For example, the application usage data for a particular software application may describe that user profiles associated with an information-technology-department user grouping within the client system are the only group that are likely to use a particular software application upon release/deployment of the software application. As another example, the application usage data for a particular software application may describe that user profiles associated with an information-technology-department user grouping within the client system are the only user profile group that are likely to use a group of advanced software components within the software application upon the release/deployment of the noted software application. In some embodiments, application usage data include recipient definition data defining a set of recipient user profiles and/or a set of recipient client devices associated with the client system, such all of the user profiles and/or all of the client devices associated with the client system.

Referring back to FIG. 4, subsequent to step/operation 404, step/operation 406, and/or step/operation 408, the example process 400 proceeds to step/operation 410. At step/operation 410, a processing circuitry (such as, but not limited to, the processing elements 205 of the central computing entity 65 described above in connection with at least FIG. 1 and FIG. 2A) generates a release note data object.

In some embodiments, the processing circuitry is configured to generate the release note data object based at least in part on one or more of the software development data retrieved at step/operation 404, the modular configuration data received at step/operation 406, and/or the application usage data determined at step/operation 408.

For example, a processing circuitry (such as, but not limited to, the processing elements 205 of the central computing entity 65 described above in connection with at least FIG. 1 and FIG. 2A) generates the release note data object based at least in part on the software development data, the client configuration modules, and the application usage data.

As described above, the term "release note data object" may refer to a data object that comprises data and/or information describing the content associated with an image that is to be deployed or released to one or more client systems. In some embodiments, the release note data object includes a common set of content data that are provided to a set of recipient user profiles and/or a set of recipient client devices associated with the client system.

In some embodiments, common set of content data are determined based at least in part on the software development data and the modular configuration data, while the set of recipient profiles and/or the set of recipient client devices are determined based at least in part on the application usage data. For example, the release note data object includes a common set of content data that are provided to a set of recipient user profiles and/or a set of recipient client devices associated with the client system. In some embodiments, common set of content data are determined based at least in part on the software development data as updated by the modular configuration data while the set of recipient profiles and/or the set of recipient client devices are determined based at least in part on the application usage data.

In some embodiments, the release note data object defines: (i) a set of recipient user profiles and/or a set of recipient client devices associated with the client system, and (ii) for each recipient user profile and/or recipient client device, a set of content data items associated with the particular recipient user profile and/or the particular recipient client device.

For example, the release note data object may define different content item segments each associated with a recipient flag. In some embodiments, the recipient flag for a content item segment describes recipient user profiles and/or recipient client devices that are authorized to access the content item segment after transmission of the release note data associated with the release note data object to the client system associated with the client system.

While various embodiments of the present invention describe generating the content data associated with a release note data object based at least in part on either the combination of the software development data and the modular configuration data, or the combination of the software development data, the modular configuration data, and the application usage data, in some embodiments, content data associated with a release note data object may be determined based at least in part on software development data alone and/or based at least in part on a combination of the software development data and the application usage data.

For example, in some embodiments, even if a processing circuitry (such as, but not limited to, the processing elements 205 of the central computing entity 65 described above in connection with at least FIG. 1 and FIG. 2A) is configured to generate a release note data object based at least in part on the combination of the software development data and the modular configuration data, the modular configuration data may include no information that affects content data associated with the release note data object. As another example, in some embodiments, even if the processing circuitry is configured to generate a release note data object based at least in part on the combination of the software development data, the modular configuration data, and the application usage data, the modular configuration data and the application usage data may include no information that affects the content data associated with the release note data object.

In some embodiments, generating the release note data object comprises retrieving a release note data object template for the release note data object, where the release note data object template defines desired data item types for inclusion among the release note data object. In some embodiments, the release note data object may have a structured document format, such as a JavaScript Object Notation (JSON) or Extensible Markup Language (XML) format, and may define desired data item types using structured tags (e.g., JSON tags or XML tags) within the structured document tag.

In some embodiments, a processing circuitry (such as, but not limited to, the processing elements 205 of the central computing entity 65 described above in connection with at least FIG. 1 and FIG. 2A) may probabilistically bind data fields inferred based at least in part on at least one of the software development data, the modular configuration data, and the application usage to each of the desired data item types using a predictive data analysis model such as a machine learning model. In some embodiments, the processing circuitry may include at least a portion of the inferred data fields among the content data for the release note data object in order to achieve a dual-optimization tradeoff scenario that seeks to maximize an average probabilistic score of the included inferred data fields while minimizing a size of the release note data above a certain size threshold. Additionally, or alternatively, the processing circuitry may include a portion of the inferred data fields among the content data when the probabilistic binding scores for each inferred data field among the portion of the inferred data fields exceeds a probabilistic binding score threshold. In some embodiments, the processing circuitry may determine an ordering and/or placement of the inferred data fields among the content data associated with the release note data object based at least in part on the probabilistic binding scores of the noted inferred data fields.

Referring back to FIG. 4, subsequent to step/operation 410, the example process 400 proceeds to step/operation 412. At step/operation 412, a processing circuitry (such as, but not limited to, the processing elements 205 of the central computing entity 65 described above in connection with at least FIG. 1 and FIG. 2A) performs one or more software application release operations by transmitting the release note data object to the client system.

For example, the processing circuitry provides generated release note data object to the client system through one or more networks. In some embodiments, the central computing entity 65 provides the generated release note data object as an entry in a wiki server and/or a cloud management server (e.g., a CloudBolt) associated with the client system. In some embodiments, the central computing entity 65 provides the generated release note data object to a communication platform (e.g., as a Slack channel message, an Outlook email, a Teams message, and/or the like) associated with the client system. In some embodiments, an operational example of a portion of an example release note data object is depicted the example user interface 800 shown in FIG. 8. In the example shown in FIG. 8, the example release note data object comprise metadata that describes various content item segments.

Referring back to FIG. 4, subsequent to step/operation 412, the example process 400 process to step/operation 414 and ends.

b. Exemplary Software Development Data Processing

Referring now to FIG. 5, an example flowchart diagram is illustrated. In particular, the example flowchart diagram illustrates an example process 500 for processing software development data to generate a release note data object.

Via the various steps/operations of the example process 500, a processing circuitry (such as, but not limited to, the processing elements 205 of the central computing entity 65 described above in connection with at least FIG. 1 and FIG. 2A) may extract raw software development data from one or more external platforms, and may generate software development data based at least in part on the raw software development data.

Referring back to FIG. 5, the example process 500 begins at step/operation 501. Subsequent to step/operation 501, the example process 500 proceeds to step/operation 503. At step/operation 503, a processing circuitry (such as, but not limited to, the processing elements 205 of the central computing entity 65 described above in connection with at least FIG. 1 and FIG. 2A) extracts software development data.

In some embodiments, the processing circuitry may interact with application programming interfaces (APIs) of one or more external platforms used during the software application device to the raw software development data. For example, the processing circuitry may transmit one or more API calls to the one or more external platforms requesting raw software development data associated with a software application. In response to receiving the API calls, the one or more external platforms provide one or more API responses to the processing circuitry that include raw software development data associated with the software application.

Referring back to FIG. 5, subsequent to step/operation 503, the example process 500 proceeds to step/operation 505. At step/operation 505, a processing circuitry (such as, but not limited to, the processing elements 205 of the central computing entity 65 described above in connection with at least FIG. 1 and FIG. 2A) generates parsed software development data based at least in part on parsing the software development data.

In some embodiments, subsequent to receiving the software development data, the processing circuitry updates the software development data by parsing the noted software development data in order to generate parsed software development data.

For example, the software development data comprises at least one of task ticket data, incident data, or configuration data as described above. In some embodiments, the processing circuitry may determine the syntactic structure of each of the task ticket data, the incident data, and the configuration data by conducting analysis on constituent words in the task ticket data, the incident data, and the configuration data according to one or more grammar rules to determine their syntactic roles. Based at least in part on the syntactic structure, the processing circuitry may generate the parsed software development data (for example, in the form of one or more parse trees).

In some embodiments, by generating parsed software development data, the processing circuitry determines the meaningfulness level of words in the software application development data comparing to one or more grammar rules, which may provide a basis for generating meaningful release note data objects, as described in detail herein.

Referring back to FIG. 5, subsequent to step/operation 505, the example process 500 proceeds to step/operation 507. At step/operation 507, a processing circuitry (such as, but not limited to, the processing elements 205 of the central computing entity 65 described above in connection with at least FIG. 1 and FIG. 2A) generates structured feature data based at least in part on conducting natural language processing operation on the parsed software development data In some embodiments, subsequent to generating the parsed software development data, the processing circuitry performs natural language processing on the parsed software development data in order to generate structured feature data for the parsed software development data.

For example, the processing circuitry may perform one or more feature extraction techniques on the parsed software development data to extract features from the parsed software development data. In this context, the term "feature extraction technique" may refer to a process, operation, algorithm, and/or the like for transforming the parsed software development data based at least in part on identifying key features of the data so that it may be suitable for further processing. Examples of feature extraction techniques may include, but not limited to Bag of Words, Word Embedding, and/or the like. Additionally, or alternatively, the processing circuitry may perform one or more machine learning algorithms to extract features from the parsed software development data.

In some embodiments, the structured feature data may be in the form of one or more matrixes. In some embodiments, the structured feature data may be in the form of one or more vectors. In some embodiments, the structured feature data may be in other form(s).

In some embodiments, the processing circuitry generates the release note data object based at least in part on the structured feature data. For example, the structured feature data may identify the key features in the software development data (for example, important data/information associated with the software application that has been identified or flagged during the development of the software application). In such an example, the release note data object may include these key features.

Referring back to FIG. 5, subsequent to step/operation 507, the example process 500 proceeds to step/operation 509 and ends.

c. Exemplary Software Development Data Update

Referring now to FIG. 6, an example flowchart diagram is illustrated. In particular, the example flowchart diagram illustrates an example process 600 for updating software development data based at least in part on the modular configuration data.

Via the various steps/operations of the example process 600, a processing circuitry (such as, but not limited to, the processing elements 205 of the central computing entity 65 described above in connection with at least FIG. 1 and FIG. 2A) may update software development data based at least in part on the modular configuration data.

Referring back to FIG. 6, the example process 600 begins at step/operation 602. Subsequent to step/operation 602, the example process 600 proceeds to step/operation 604. At step/operation 604, a processing circuitry (such as, but not limited to, the processing elements 205 of the central computing entity 65 described above in connection with at least FIG. 1 and FIG. 2A) receives modular configuration data.

For example, the processing circuitry receives the modular configuration data similar to step/operation 406 described above in connection with FIG. 4. As described above, the modular configuration data may refer to a data object that describes one or more client configuration modules for at least one of the software application and the client system, and the client configuration module may refer to a data object that describes desired contents of a release note data object for the software application.

Referring back to FIG. 6, subsequent to step/operation 604, the example process 600 proceeds to step/operation 606. At step/operation 606, a processing circuitry (such as, but not limited to, the processing elements 205 of the central computing entity 65 described above in connection with at least FIG. 1 and FIG. 2A) determines one or more modification operations and/or one or more testing operations associated with the modular configuration data and/or the client configuration module.

As described above, the modular configuration data and/or the client configuration module may include information about required configuration modification operations for the software application, which in turn may cause one or more modifications to the software application. Additionally, or alternatively, the modular configuration data and/or the client configuration module may include information about required testing operations for the software application prior to the release/deployment of the software application For example, a client configuration module may require addition of a new antivirus software to the software application. As another example, a client configuration module includes information about required security scan for the software application prior to the release/deployment of the software application.

Referring back to FIG. 6, subsequent to step/operation 606, the example process 600 proceeds to step/operation 608. At step/operation 608, a processing circuitry (such as, but not limited to, the processing elements 205 of the central computing entity 65 described above in connection with at least FIG. 1 and FIG. 2A) updates the software development data based at least in part on the modular configuration data and/or the client configuration module.

Continuing from the example above, a client configuration module may require addition of a new antivirus software to the software application. In this example, a processing circuitry (such as, but not limited to, the processing elements 205 of the central computing entity described above in connection with at least FIG. 1 and FIG. 2A) may modify the software development data by removing references to a prior antivirus software installed on the software application and/or by adding references to the new antivirus software for the software application.

As another example, a client configuration module may include information about required testing procedures for the software application prior to the release/deployment of the software application. In some of the noted embodiments, the processing circuitry is configured to update the software development data based at least in part on at least a portion of the noted testing procedures. For example, if a client configuration module requires a new security scan for the software application, the processing circuitry may modify the software development data by removing references to a prior security scan for the software application and/or by adding references to the security scan for the software application.

Referring back to FIG. 6, subsequent to step/operation 608, the example process 600 proceeds to step/operation 610 and ends.

In some embodiments, the processing circuitry (such as, but not limited to, the processing elements 205 of the central computing entity 65 described above in connection with at least FIG. 1 and FIG. 2A) is configured to: retrieve a base image associated with at least one software application; generate a customized base image based at least in part on conducting at least one operational verification operation on the base image; generate a validated base image based at least in part on conducting at least one operational testing operation on the customized base image; generate a release note data object associated with the validated base image; and perform one or more image release operations by releasing the validated base image and the release note data object to at least one client system.

In some embodiments, the processing circuitry (such as, but not limited to, the processing elements 205 of the central computing entity 65 described above in connection with at least FIG. 1 and FIG. 2A) is configured to: retrieve software development data associated with a software application; receive modular configuration data from a client system; determine application usage data based at least in part on a user profile of the client system that is associated with the software application; generate a release note data object based at least in part on at least one of the software development data, the modular configuration data, and the application usage data; and perform one or more software application release operations by transmitting the release note data object to the client system.

VI. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus comprising at least one processor and at least one non-transitory memory comprising a computer program code, the at least one non-transitory memory and the computer program code configured to, with the at least one processor, cause the apparatus to:
   transmit, via a first call to an external platform, a request for software development data;
   receive, from the external platform and in response to the first call, the software development data;
   parse the software development data to generate parsed software development data by:
      determining a plurality of portions of data in the software development data, wherein the plurality of portions of data are each associated with at least one of a plurality of data types;
      determining, for each of the plurality of portions of data, a syntactic structure of each of the portions of data of the plurality of portions of data based on one or more constituent words of each of the portions of data;
      generating the parsed software development data based on the syntactic structure of each of the portions of data;
   receive modular configuration data for a software application from a client system, wherein the modular configuration data comprises: (i) first modular configuration data describing one or more required modification operations for all software applications deployed on the client system, (ii) second modular configuration data describing one or more required testing operations for all software applications deployed on the client system, (iii) third modular configuration data describing one or more required modification operations for all software applications having a software application type of the software application, and (iv) fourth modular configuration data describing one or more required testing operations for all software applications having the software application type of the software application;
   determine application usage data based at least in part one or more user profiles of the client system associated with the software application, wherein each of the one or more user profiles is associated with one or more recipient client devices;
   generate a release note data object that comprises one or more first data fields determined based at least in part on the parsed software development data, the first modular configuration data, one or more second data fields determined based at least in part on the second modular configuration data, one or more third data fields determined based at least in part on the third modular configuration data, and one or more fourth data fields determined based at least in part on the fourth modular configuration data; and
   initiate performance of one or more software application release operations by automatically transmitting the release note data object to a set of recipient client devices of the client system.

2. The apparatus of claim 1, wherein
the external platform is a software provisioning platform.

3. The apparatus of claim 1, wherein
the external platform is an application deployment platform.

4. The apparatus of claim 1, wherein the at least one non-transitory memory and the computer program code are configured to, with the at least one processor, cause the apparatus to:
   generate structured feature data based at least in part on conducting natural language processing operation on the parsed software development data, wherein the release note data object is generated based at least in part on the structured feature data.

5. The apparatus of claim 1, wherein the modular configuration data comprises at least one configuration module, and wherein the at least one non-transitory memory and the computer program code are configured to, with the at least one processor, cause the apparatus to:
   update the software development data based at least in part on the at least one configuration module.

6. The apparatus of claim 1, wherein the at least one data type includes task ticket data, incident data, or configuration data.

7. The apparatus of claim 1, wherein the modular configuration data comprises cross-application modular configuration data shared among a plurality of software applications on the client system.

8. The apparatus of claim 1, wherein the modular configuration data comprises cross-application modular configuration data shared among a plurality of software applications of a common application type.

9. A computer-implemented method comprising:
   transmitting, via a first call to an external platform, a request for software development data;
   receiving, from the external platform and in response to the first call, the software development data;

parsing the software development data to generate parsed software development data by:
  determining a plurality of portions of data in the software development data, wherein the plurality of portions of data are each associated with at least one of a plurality of data types;
  determining a first syntactic structure of a first portion of data of the plurality of portions of data based on one or more constituent words in the first portion of data, wherein the first portion of data is from a first of the plurality of data types;
  generating the parsed software development data based on the syntactic structure of each of the portions of data;
receiving modular configuration data for a software application from a client system, wherein the modular configuration data comprises: (i) first modular configuration data describing one or more required modification operations for all software applications deployed on the client system, (ii) second modular configuration data describing one or more required testing operations for all software applications deployed on the client system, (iii) third modular configuration data describing one or more required modification operations for all software applications having a software application type of the software application, and (iv) fourth modular configuration data describing one or more required testing operations for all software applications having the software application type of the software application;
determining application usage data based at least in part one or more user profiles of the client system associated with the software application, wherein each of the one or more user profiles is associated with one or more recipient client devices;
generating a release note data object that comprises one or more first data fields determined based at least in part on the parsed software development data, the first modular configuration data, one or more second data fields determined based at least in part on the second modular configuration data, one or more third data fields determined based at least in part on the third modular configuration data, and one or more fourth data fields determined based at least in part on the fourth modular configuration data; and
initiating performance of one or more software application release operations by automatically transmitting the release note data object to a set of recipient client devices of the client system.

10. The computer-implemented method of claim 9, wherein the external platform is a software provisioning platform.

11. The computer-implemented method of claim 9, wherein the external platform is an application deployment platform.

12. The computer-implemented method of claim 9, further comprising:
generating structured feature data based at least in part on conducting natural language processing operation on the parsed software development data, wherein the release note data object is generated based at least in part on the structured feature data.

13. The computer-implemented method of claim 9, wherein the modular configuration data comprises at least one configuration module, and wherein the computer-implemented method comprises:

updating the software development data based at least in part on the at least one configuration module.

14. The computer-implemented method of claim 9, wherein the at least one data type includes task ticket data, incident data, or configuration data.

15. The computer-implemented method of claim 9, wherein the modular configuration data comprises cross-application modular configuration data shared among a plurality of software applications on the client system.

16. The computer-implemented method of claim 9, wherein the modular configuration data comprises cross-application modular configuration data shared among a plurality of software applications of a common application type.

17. A computer program product comprising at least one non-transitory computer-readable storage medium having computer-readable program code portions stored therein, the computer-readable program code portions comprising an executable portion configured to:
transmit, via a first call to an external platform, a request for software development data;
receive, from the external platform and in response to the first call, the software development data;
parse the software development data to generate parsed software development data by:
  determining a plurality of portions of data in the software development data, wherein the plurality of portions of data are each associated with at least one of a plurality of data types;
  determining, for each of the plurality of portions of data, a syntactic structure of each of the portions of data of the plurality of portions of data based on one or more constituent words of each of the portions of data;
  generating the parsed software development data based on the syntactic structure of each of the portions of data;
receive modular configuration data for a software application from a client system, wherein the modular configuration data comprises: (i) first modular configuration data describing one or more required modification operations for all software applications deployed on the client system, (ii) second modular configuration data describing one or more required testing operations for all software applications deployed on the client system, (iii) third modular configuration data describing one or more required modification operations for all software applications having a software application type of the software application, and (iv) fourth modular configuration data describing one or more required testing operations for all software applications having the software application type of the software application;
determine application usage data based at least in part one or more user profiles of the client system associated with the software application, wherein each of the one or more user profiles is associated with one or more recipient client devices;
generate a release note data object that comprises one or more first data fields determined based at least in part on the parsed software development data, the first modular configuration data, one or more second data fields determined based at least in part on the second modular configuration data, one or more third data fields determined based at least in part on the third modular configuration data, and one or more fourth data fields determined based at least in part on the fourth modular configuration data; and initiate performance of one or more software application release operations by automatically transmitting the release note data object to a set of recipient client devices of the client system.

\* \* \* \* \*